US012264586B2

(12) United States Patent
Laureano et al.

(10) Patent No.: US 12,264,586 B2
(45) Date of Patent: Apr. 1, 2025

(54) AIRCRAFT PISTON SEAL RING INCLUDING ANTI-ROTATION PROVISIONS

(71) Applicant: RTX Corporation, Farmington, CT (US)

(72) Inventors: Pedro D. Laureano, Jacksonville, FL (US); Raghib A. Chowdhury, Royal Palm Beach, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/230,774

(22) Filed: Aug. 7, 2023

(65) Prior Publication Data

US 2025/0052167 A1 Feb. 13, 2025

(51) Int. Cl.
*F01D 11/00* (2006.01)

(52) U.S. Cl.
CPC ........ *F01D 11/003* (2013.01); *F05D 2240/58* (2013.01)

(58) Field of Classification Search
CPC ............................ F01D 11/003; F05D 2240/58
See application file for complete search history.

(56) References Cited

U.S. PATENT DOCUMENTS 3,836,216 A * 9/1974 Junker .................. F01D 11/003 277/580
5,058,904 A 10/1991 Nevola
5,174,584 A * 12/1992 Lahrman ............... F01D 11/003 277/400
10,436,322 B2 10/2019 Svrcek et al.
2015/0056068 A1* 2/2015 Wiebe ........................ F02C 7/28 415/173.1
2015/0121880 A1* 5/2015 Kidder ..................... F01D 9/023 60/722
2019/0049009 A1* 2/2019 Svrcek ........................ F16J 9/16
2019/0249605 A1 8/2019 Amador et al.
2019/0390770 A1* 12/2019 Svrcek ........................ F16J 9/16
2021/0087941 A1* 3/2021 Davis .................... F16J 15/3464
2022/0056808 A1* 2/2022 Sandoval ............. F16J 15/3464
2022/0356948 A1* 11/2022 Svrcek ........................ F16J 9/16
2023/0175409 A1* 6/2023 Miller ................... F01D 25/183 415/1

FOREIGN PATENT DOCUMENTS

CN 105736701 B 9/2019
GB 412695 7/1934
WO 20160179608 A2 11/2016

OTHER PUBLICATIONS

Extended European Search Report for counterpart EP Application No. 24192392.9 dated Jan. 3, 2025.

* cited by examiner

*Primary Examiner* — Aaron R Eastman
(74) *Attorney, Agent, or Firm* — Bachman & LaPointe, P.C.

(57) ABSTRACT

A piston seal ring including a body shaped as an annular ring having an inner diameter and an outer diameter; an end gap formed in the body; a first interface surface formed on the body between the inner diameter and the outer diameter; a second interface surface orthogonally adjacent the first interface surface; and a receiver extending from the first interface surface substantially opposite the end gap, the receiver including a cavity configured to support a lug.

18 Claims, 4 Drawing Sheets

AIRCRAFT PISTON SEAL RING INCLUDING ANTI-ROTATION PROVISIONS

BACKGROUND

The present disclosure is directed to a piston seal ring design including a receiver feature to support a lug for the prevention of unwanted rotation.

The existing gas turbine engine architecture currently utilizes a piston seal ring at various rotating interface boundaries. The piston seal ring design intent is to provide for secondary air flow sealing in locations such as the High Pressure Turbine static compartment. A secondary function of the piston seal ring is to accommodate for large deflections while maintaining the air sealing capabilities in a high temperature environment. As a result of the high air and temperature operating environment, the piston seal rings have been observed with high wear and also show evidence of circumferential motion during engine operation. Due to the symmetrical nature of the piston seal ring geometry, there is high risk of installing the piston seal ring in the incorrect orientation (flipped). An incorrectly installed piston seal ring can result in increases in cavity leakages and higher temperatures to hardware in the cavities. These seals are currently experiencing excessive wear in the field due to significant relative motion.

What is needed is a piston seal ring with a raised material section to support a lug that can prevent unwanted piston seal ring rotation and mistake proof installation.

SUMMARY

In accordance with the present disclosure, there is provided a piston seal ring comprising a body shaped as an annular ring having an inner diameter and an outer diameter; an end gap formed in the body; a first interface surface formed on the body between the inner diameter and the outer diameter; a second interface surface orthogonally adjacent the first interface surface; and a receiver extending from the first interface surface substantially opposite the end gap, the receiver including a cavity configured to support a lug.

A further embodiment of any of the foregoing embodiments may additionally and/or alternatively include the cavity being formed between a pair of opposing side walls coupled with an upper shelf and a lower shelf opposite the upper shelf.

A further embodiment of any of the foregoing embodiments may additionally and/or alternatively include the receiver being formed as a section of material integral with the body along a circumference of the piston seal ring.

A further embodiment of any of the foregoing embodiments may additionally and/or alternatively include the receiver comprises an upper shelf along with opposing side walls to form a C-channel shape cavity.

A further embodiment of any of the foregoing embodiments may additionally and/or alternatively include the receiver includes opposing side walls extending from the first interface surface.

A further embodiment of any of the foregoing embodiments may additionally and/or alternatively include the lug is configured for mistake proofing and as an anti-rotation device preventing the piston seal ring from rotation against a mating part.

A further embodiment of any of the foregoing embodiments may additionally and/or alternatively include the cavity is selected from the group consisting of a C-channel, D-channel, L-channel, I-channel and O-channel.

In accordance with the present disclosure, there is provided a piston seal ring within a gas turbine engine compartment comprising a body shaped as an annular ring having an inner diameter and an outer diameter; an end gap formed in the body; a first interface surface formed on the body between the inner diameter and the outer diameter; a second interface surface orthogonally adjacent the first interface surface; a receiver extending from the first interface surface substantially opposite the end gap, the receiver including a cavity configured to support a lug; and at least one casing mount formed within the gas turbine engine compartment; and at least one turbine frame static structure formed within the gas turbine engine compartment proximate the at least one casing mount; wherein the piston seal ring is secured between the at least one casing mount and the at least one turbine frame static structure configured to fluidly separate the gas turbine engine compartment.

A further embodiment of any of the foregoing embodiments may additionally and/or alternatively include the receiver is formed between about 160 degrees to about 200 degrees apart from the end gap.

A further embodiment of any of the foregoing embodiments may additionally and/or alternatively include the piston seal ring within a gas turbine engine compartment further comprising multiple receivers formed in the body at spaced apart intervals around a circumference of the body.

A further embodiment of any of the foregoing embodiments may additionally and/or alternatively include the multiple receivers are spaced opposite to each other around the circumference.

A further embodiment of any of the foregoing embodiments may additionally and/or alternatively include the lug is configured as an anti-rotation device preventing the piston seal ring from rotation relative to the at least one casing mount.

A further embodiment of any of the foregoing embodiments may additionally and/or alternatively include the receiver is configured with the cavity having a depth dimension that is a function of the ratio of receiver thickness relative to a piston seal ring width or a piston seal ring height.

In accordance with the present disclosure, there is provided a process for preventing piston seal ring wear comprising mounting the piston seal ring within a gas turbine engine compartment adjacent at least one casing mount formed within the gas turbine engine compartment and at least one turbine frame static structure formed within the gas turbine engine compartment proximate the at least one casing mount; the piston seal ring comprising: a body shaped as an annular ring having an inner diameter and an outer diameter; an end gap formed in the body; a first interface surface formed on the body between the inner diameter and the outer diameter; a second interface surface orthogonally adjacent the first interface surface; and a receiver extending from the first interface surface substantially opposite the end gap, the receiver including a cavity configured to support a lug.

A further embodiment of any of the foregoing embodiments may additionally and/or alternatively include the process further comprising securing the piston seal ring between the at least one casing mount and the at least one turbine frame static structure; and fluidly separating the gas turbine engine compartment.

A further embodiment of any of the foregoing embodiments may additionally and/or alternatively include the process further comprising abutting the lug against one of the at least one casing mount and the at least one turbine frame static structure.

A further embodiment of any of the foregoing embodiments may additionally and/or alternatively include the process further comprising forming receiver as a section of material integral with the body along a circumference of the piston seal ring.

A further embodiment of any of the foregoing embodiments may additionally and/or alternatively include the process further comprising forming multiple receivers the body at spaced apart intervals around a circumference of the body.

A further embodiment of any of the foregoing embodiments may additionally and/or alternatively include the cavity is selected from the group consisting of a C-channel, D-channel, L-channel, I-channel and O-channel.

A further embodiment of any of the foregoing embodiments may additionally and/or alternatively include the receiver is formed between about 160 degrees to about 200 degrees apart from the end gap.

Other details of the piston seal ring are set forth in the following detailed description and the accompanying drawings wherein like reference numerals depict like elements.

DETAILED DESCRIPTION

Figure 1:
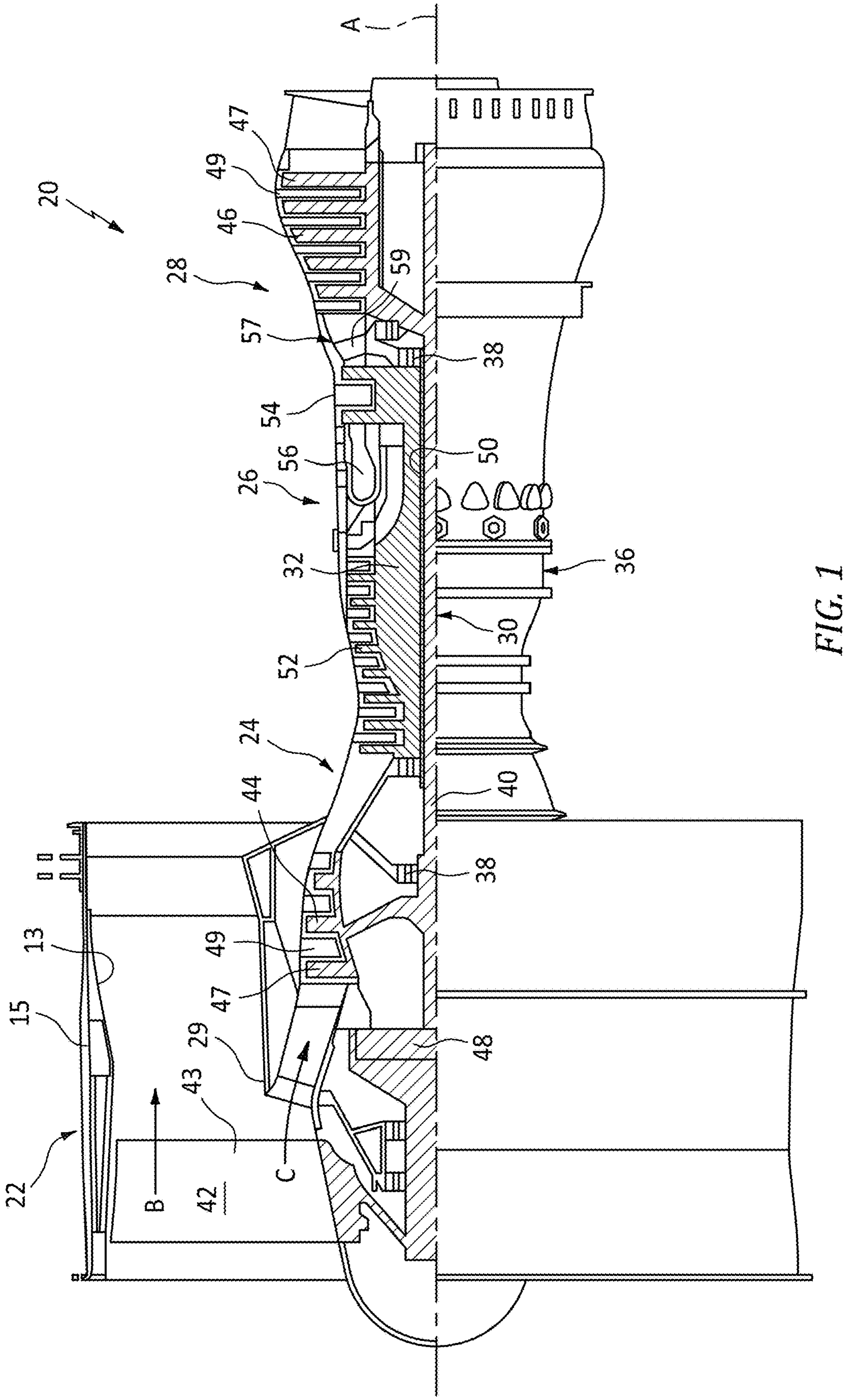
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(\text{Tram}°\ \text{R})/(518.7°\ \text{R})]^{0.5}$. The "low corrected fan tip speed" can be less than or equal to 1150.0 ft/second (350.5 meters/second), and greater than or equal to 1000.0 ft/second (304.8 meters/second).

Figure 2:
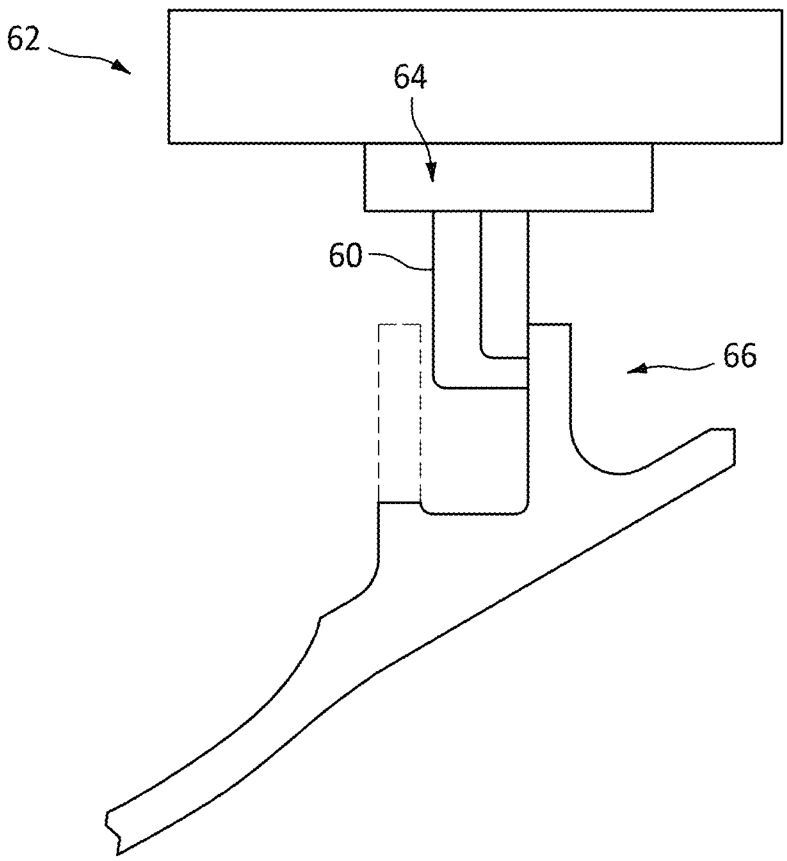
FIG. 2 is a cross section schematic representation of an exemplary piston seal ring separating an engine compartment.

Referring also to FIG. 2 an exemplary piston seal ring 60 separating an engine compartment 62. The piston seal ring 60 can be seated between a casing mount 64 and a turbine frame static structure 66. The piston seal ring 60 is configured to provide secondary air flow sealing in the engine compartment 62 between the casing mount 64 and turbine frame static structure 66.

Figure 3:
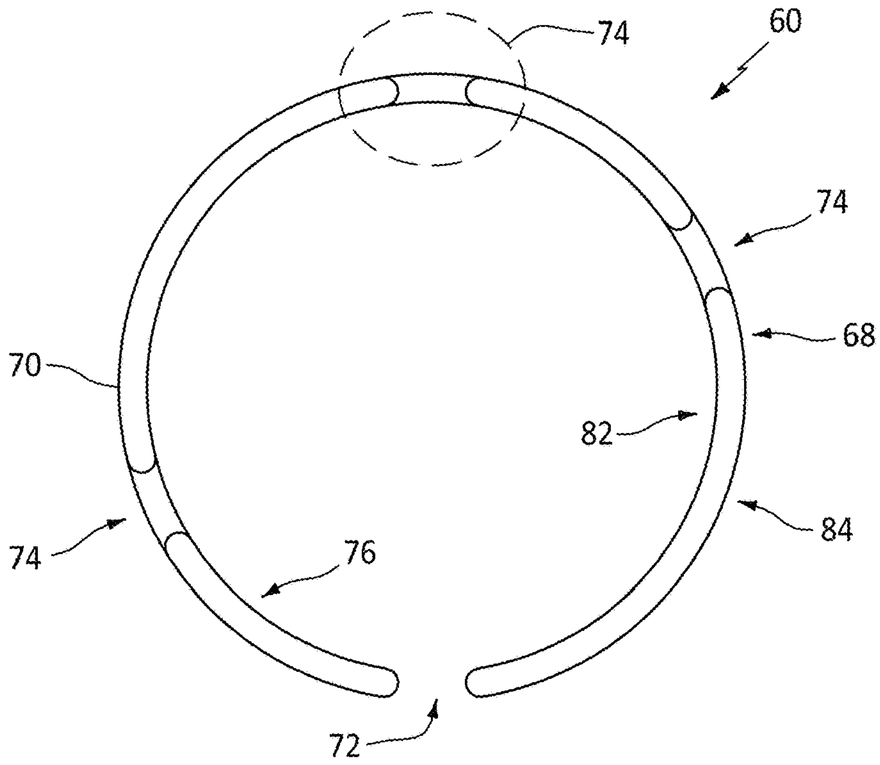
FIG. 3 is a front view schematic representation of an exemplary piston seal ring.

Referring also to FIG. 3, an exemplary piston seal ring 60 is shown. The piston seal ring 60 includes a body 68 shaped as an annular ring 70. An end gap 72 is formed in the body 68. The end gap 72 is a discontinuity in the body 68. The body 68 has a receiver 74 formed opposite the end gap 72. It is contemplated that the receiver 74 is formed 180 degrees apart from the end gap 72. In an exemplary embodiment, the receiver 74 can be formed at locations approximately opposite the end gap 72. For example, the receiver 74 can be formed between about 160 degrees to about 200 degrees apart from the end gap 72. In an exemplary embodiment, multiple receivers 74 can be formed in the body 68 at spaced apart intervals around a circumference 76. The intervals can be evenly spaced apart. In another exemplary embodiment, the receivers 74 can be spaced opposite to each other around the circumference 76.

Referring also to FIG. 4, FIG. 5, FIG. 6 and FIG. 7. The receiver 74 is formed as a section of material integral with the body 68 along the circumference 76 of the piston seal ring 60. In an exemplary embodiment, the receiver 74 can be formed by the addition of material to a first interface surface 78 of the body 68. The body 68 includes the first interface surface 78 as well as a second interface surface 80 orthogonally adjacent to the first interface surface 78. The body 68 includes an inner diameter 82 and an outer diameter 84 opposite the inner diameter 82, as shown in FIG. 3. The body 68 includes a width 86. The first interface surface 78 can be located between the inner diameter 82 and the outer diameter 84. The second interface surface 80 can be located proximate the outer diameter 84.

The receiver 74 is shown extending from the first interface surface 78 of the body 68. The dimension 88 represents the thickness or depth of the receiver 74 from the first interface surface 80. The depth dimension 88 can vary depending on the piston seal ring 60. The depth 88 can be a function of the body 68 outer diameter 84 to body 68 width 86 ratio of the piston seal ring 60.

Figure 4:
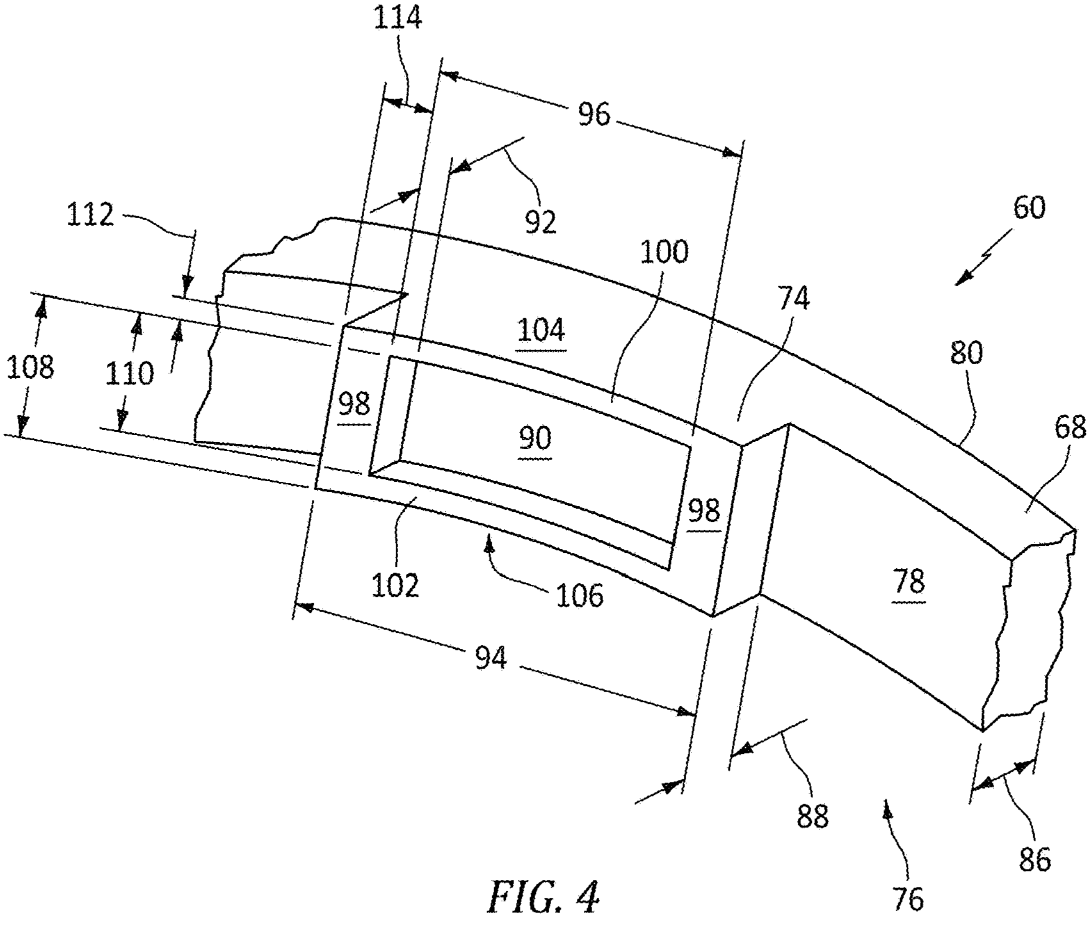
FIG. 4 is a partial isometric view schematic representation of an exemplary piston seal ring.
Figure 5:
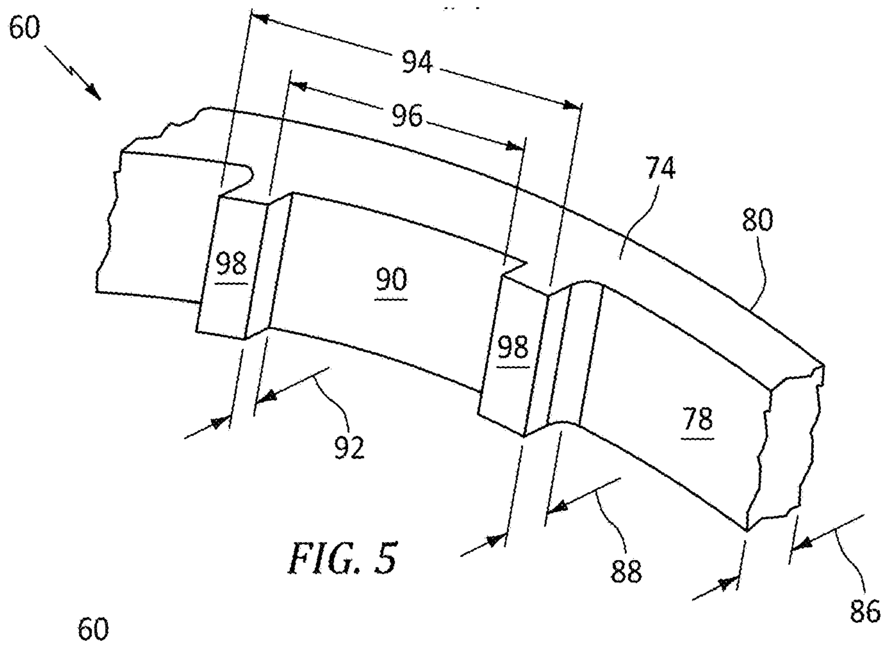
FIG. 5 is a partial isometric view schematic representation of an exemplary piston seal ring.
Figure 6:
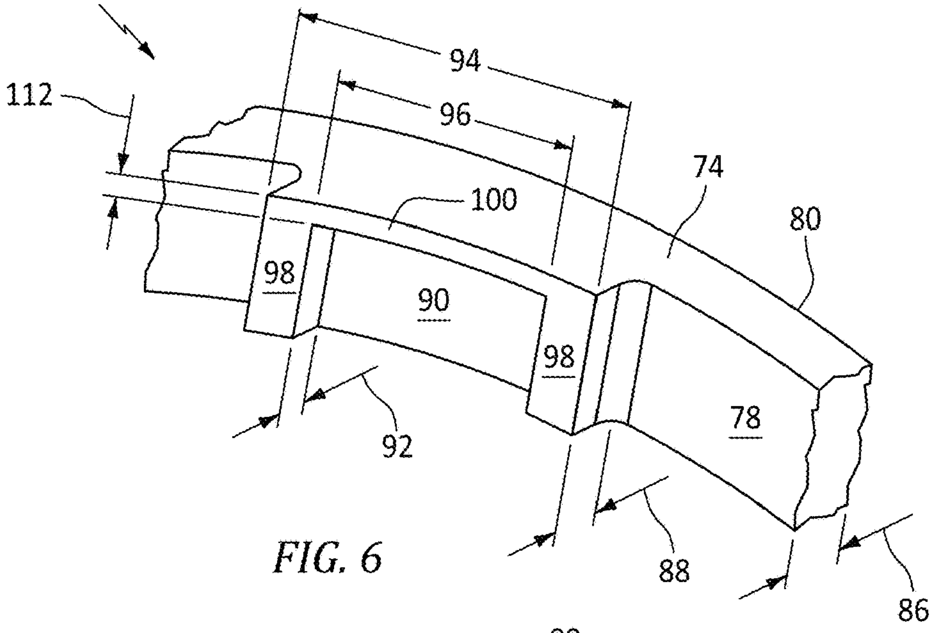
FIG. 6 is a partial isometric view schematic representation of an exemplary piston seal ring.

The receiver 74 can be configured with a fully enclosed cavity 90, as shown in FIG. 4. In other exemplary embodiments, the receiver 74 can be configured as a partially enclosed cavity 90 as seen in FIG. 5 and FIG. 6. The cavity 90 can be shaped as a C-channel, D-channel, L-channel, I-channel and O-channel. In an exemplary embodiment, the cavity 90 can be configured with a single shelf and be open on three sides.

The receiver 74 can include a depth 92. The depth 92 dimension can be less than the thickness depth dimension 88.

The receiver 74 can have a first width 94. The first width 94 defines the external width dimension of the receiver 74. A second width 96 dimension can define the opening width of the cavity 90 of the receiver 74. The cavity 90 can be defined by side walls 98 and upper shelf 100 and lower shelf 102. The cavity 90 being formed between a pair of opposing side walls 98 coupled with the upper shelf 100 and the lower shelf 102 opposite the upper shelf 100. The difference in dimension between the first width 94 and the second width 96 can define the side wall 98 thickness. The side wall 98 thickness can be a third width 114.

The distance between an exterior surface 104 of the upper shelf 100 and an exterior surface 106 of the lower shelf 102 can define a first height 108. The dimension between the upper shelf 100 and the lower shelf 102 within the cavity 90, as shown, can define a second height 110. The thickness of the upper shelf 100 can be defined as the third height 112. The thickness of the upper shelf 100 can be defined as a function of the ratio between the piston seal ring outer diameter 84 to the body width 86. The lower shelf 102 can have the same thickness dimension as the upper shelf 100. It is contemplated that the upper shelf 100 and lower shelf 102 can have different thickness dimensions.

As seen in FIG. 5, the receiver 74 includes side walls 98 in the absence of the upper shelf 100 and the lower shelf 102. As seen in FIG. 6 the receiver 74 can include an upper shelf 100 along with each side wall 98 to form a C-channel shape.

The receiver 74 can be configured with the cavity 90 having a depth dimension 92 that is a function of the ratio of depth 88 relative to the piston seal ring width 86 or height 108. The receiver can be configured with the cavity 90 having a height dimension 110.

The receiver 74 can be sized to reduce the amount of concentrated stress on the piston seal ring 60. The receiver 74 thickness 88 can be configured to minimize weight and stress concentration impact on the piston seal ring 60. The receiver 74 depth 92, height 110 and width 96 can be tailored to optimize the receiver 74.

Figure 7:
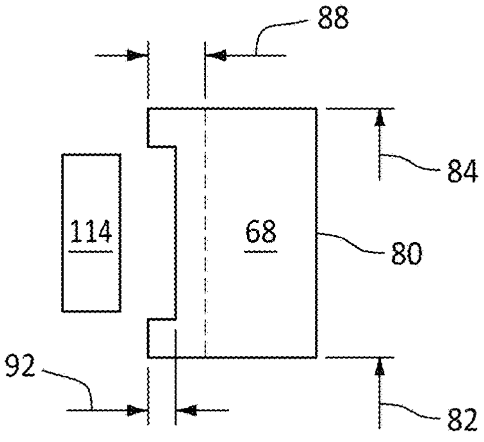
FIG. 7 is a cross section schematic representation of an exemplary piston seal ring receiver.

The receiver 74 can be configured to accept the insertion of a lug 114, see FIG. 7. The lug 114 can be attached to the receiver 74 by mechanical or metallurgical techniques. The lug 114 is a feature that allows for mistake proofing, so that the physical shape of the lug 114 prevents installation of the piston seal ring 60 from being installed incorrectly and promotes correct installation. The lug 114 is a feature that functions as an anti-rotation device preventing the piston seal ring 60 from rotation against a mating part such as the casing mount 64 and turbine frame static structure 66. The lug 114 can abut one of the casing mount 64 and the turbine frame static structure 66. Preventing the piston seal ring 60 from rotation from its position within the engine can reduce wear and extend durability of the piston seal ring 60 and the associated surfaces of mating parts.

A technical advantage of the disclosed piston seal ring includes the incorporation of the receiver which provides a location to secure a stop/lug feature.

Another technical advantage of the disclosed piston seal ring includes the new functional feature of the stop/lug to allow for primary mistake proofing.

Another technical advantage of the disclosed piston seal ring includes an anti-rotation feature that prevents the piston seal ring from rotation relative to mating parts.

Another technical advantage of the disclosed piston seal ring includes a feature to prevent the piston seal ring from spinning in its engine mount position.

Another technical advantage of the disclosed piston seal ring includes reducing the wear on the piston seal ring at interface surfaces and the associated surfaces of the mating parts.

Another technical advantage of the disclosed piston seal ring includes that with offset surface from the primary seal body, that there is added strength capability to the location to allow for receiver without sacrificing the structural integrity of the seal.

There has been provided a piston seal ring. While the piston seal ring has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A piston seal ring comprising:

a single body shaped as an annular ring having an inner diameter and an outer diameter;

an end gap formed in the body;

a first interface surface formed on the body between the inner diameter and the outer diameter;

a second interface surface orthogonally adjacent the first interface surface; and a receiver extending from the first interface surface opposite the end gap, the receiver including a cavity configured to support a lug; wherein the piston seal ring is configured to fluidly separate a gas turbine engine compartment.

2. The piston seal ring according to claim 1, wherein the cavity is formed between a pair of opposing side walls coupled with an upper shelf and a lower shelf opposite the upper shelf.

3. The piston seal ring according to claim 1, wherein the receiver is formed as a section of material integral with the body along a circumference of the piston seal ring.

4. The piston seal ring according to claim 1, wherein the receiver comprises an upper shelf along with opposing side walls to form a C-channel shape cavity.

5. The piston seal ring according to claim 1, wherein the receiver includes opposing side walls extending from the first interface surface.

6. The piston seal ring according to claim 1, wherein the lug is configured for mistake proofing and as an anti-rotation device preventing the piston seal ring from rotation against a mating part.

7. The piston seal ring according to claim 1, wherein the cavity is selected from the group consisting of a C-channel, and D-channel.

8. A piston seal ring within a gas turbine engine compartment comprising:

a body shaped as an annular ring having an inner diameter and an outer diameter;

an end gap formed in the body;

a first interface surface formed on the body between the inner diameter and the outer diameter;

a second interface surface orthogonally adjacent the first interface surface;

a receiver extending from the first interface surface opposite the end gap, the receiver including a cavity configured to support a lug; and at least one casing mount formed within the gas turbine engine compartment; and at least one turbine frame static structure formed within the gas turbine engine compartment proximate the at least one casing mount; wherein the piston seal ring is secured between the at least one casing mount and the at least one turbine frame static structure configured to fluidly separate the gas turbine engine compartment.

9. The piston seal ring within a gas turbine engine compartment according to claim 8, wherein the receiver is formed between 160 degrees to 200 degrees apart from the end gap.

10. The piston seal ring within a gas turbine engine compartment according to claim 8, further comprising:

multiple receivers formed in the body at spaced apart intervals around a circumference of the body.

11. The piston seal ring within a gas turbine engine compartment according to claim 10, wherein the multiple receivers are spaced opposite to each other around the circumference.

12. The piston seal ring within a gas turbine engine compartment according to claim 8, wherein the lug is configured as an anti-rotation device preventing the piston seal ring from rotation relative to the at least one casing mount.

13. A process for preventing piston seal ring wear comprising:

mounting the piston seal ring within a gas turbine engine compartment adjacent at least one casing mount formed within the gas turbine engine compartment and at least one turbine frame static structure formed within the gas turbine engine compartment proximate the at least one casing mount; the piston seal ring comprising:

a body shaped as an annular ring having an inner diameter and an outer diameter;

an end gap formed in the body;

a first interface surface formed on the body between the inner diameter and the outer diameter;

a second interface surface orthogonally adjacent the first interface surface;

a receiver extending from the first interface surface opposite the end gap, the receiver including a cavity configured to support a lug; and abutting the lug against one of the at least one casing mount and the at least one turbine frame static structure.

14. The process of claim 13, further comprising:

securing the piston seal ring between the at least one casing mount and the at least one turbine frame static structure; and fluidly separating the gas turbine engine compartment.

15. The process of claim 13, further comprising:

forming receiver as a section of material integral with the body along a circumference of the piston seal ring.

16. The process of claim 13, further comprising:

forming multiple receivers in the body at spaced apart intervals around a circumference of the body.

17. The process of claim 13, wherein the cavity is selected from the group consisting of a C-channel, and D-channel.

18. The process of claim 13, wherein the receiver is formed between 160 degrees to 200 degrees apart from the end gap.

* * * * *